(12) United States Patent
Lew

(10) Patent No.: US 11,372,752 B2
(45) Date of Patent: Jun. 28, 2022

(54) TOPOLOGICAL SCHEDULING

(71) Applicant: Google LLC, Mountain View, CA (US)

(72) Inventor: Lukasz Lew, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 87 days.

(21) Appl. No.: 16/718,049

(22) Filed: Dec. 17, 2019

(65) Prior Publication Data

US 2021/0182186 A1 Jun. 17, 2021

(51) Int. Cl.
G06F 12/02 (2006.01)
G06N 20/00 (2019.01)
G06F 7/523 (2006.01)
G06N 3/063 (2006.01)

(52) U.S. Cl.
CPC .......... *G06F 12/0207* (2013.01); *G06F 7/523* (2013.01); *G06N 3/063* (2013.01); *G06N 20/00* (2019.01); *G06F 2212/2024* (2013.01)

(58) Field of Classification Search
CPC ...... G06F 7/523; G06F 7/5318; G06F 7/5443; G06F 7/57; G06F 7/575; G06F 12/0207; G06N 3/04; G06N 3/063
See application file for complete search history.

(56) References Cited

U.S. PATENT DOCUMENTS 10,445,638 B1 * 10/2019 Amirineni .............. G06N 5/046
2018/0046906 A1 2/2018 Dally et al.
2020/0293379 A1 * 9/2020 Zhang .................... G06N 3/063
2020/0410036 A1 * 12/2020 Huynh ............... G06K 9/00456
2021/0124560 A1 * 4/2021 Liu ......................... G06F 17/16

OTHER PUBLICATIONS

Cadambi et al, "A Programmable Parallel Accelerator for Learning and Classification" 2020 19th International Conference on Parallel Architectures and Compilation Techniques, Sep. 2020, 11 pages.
Chen et al, DaDianNao: A Machine-Learning Supercomputer: 2014 47th Annual IEEE, Dec. 2014, 14 pages.
Lu et al., "FlexFlow: A Flexible Dataflow Accelerator Architecture fo Convolutional Neural Networks" 2017 IEEE International Symposium on High Performance Computer Architecture, Feb. 2017, 12 pages.

(Continued)

*Primary Examiner* — Emily E Larocque
(74) *Attorney, Agent, or Firm* — Fish & Richardson P.C.

(57) ABSTRACT

Methods, systems, and apparatus, including computer programs encoded on computer storage media, for performing topological scheduling on a machine-learning accelerator having an array of tiles. One of the methods includes performing, at each time step of a plurality of time steps corresponding respectively to columns within each of a plurality of wide columns of the tile array, operations comprising: performing respective multiplications using tiles in a respective tile column for the time step, computing a respective output result for each respective tile column for the time step including computing a sum of results of the multiplications for the tile column, and storing the respective output result for the tile column in a particular output RAM having a location within the same tile column and on a row from which the output result will be read by a subsequent layer of the model.

19 Claims, 7 Drawing Sheets

(56) References Cited

OTHER PUBLICATIONS

PCT International Search Report and Written Opinion in International Application No. PCT/US2020/047825, dated Dec. 14, 2020, 19 pages.
Zhang et al., "Analyzing and mitigating the impact of permanent faults on a systolic array based neural network accelerator" 2018 IEEE 36th VLSI Test Symposium, Apr. 2018, 6 pages.
Extended European Search Report in European Application No. 20193931.1, dated Feb. 24, 2021, 12 pages.

* cited by examiner

TOPOLOGICAL SCHEDULING

BACKGROUND

This specification relates to machine-learning accelerators.

A machine-learning accelerator is an application-specific integrated circuit (ASIC) that is designed for performing highly parallel synchronous operations. The parallelism is achieved by integrating many different independent processing elements that can execute concurrently.

Such devices can be used to accelerate inference passes through neural networks. Neural networks are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Typically, the computational operations required for each layer require many multiply-accumulate (MAC) operations. In the usual case, each layer reads in activations computed by a previous layer, multiplies the activations by one or more layer-specific weights, and computes a sum of the multiplication results. In this specification, the term "activation" is used for inputs to the layers of a machine-learning accelerator because in real-world systems, the layers may operate on matrixes or tensors rather than individual values. For example, to perform a 3×3 convolution, each of 9 input activations can be multiplied by 9 respective weights, and the sum of the multiplies is a single output activation for the next layer.

Some accelerators use tiles and vector accumulators to implement MAC operations, with tiles being used to multiply activations by weights, and vector accumulators being used to sum the results and to apply other layer transformations to the result. In this specification, a tile refers to a device having a computational array of cells that can perform computations on a portion of a matrix or tensor. Each cell thus includes circuitry that allows the cell to perform mathematical or other computations. In a typical scenario, a tile receives an input tensor, uses the computational array of cells to multiply the input tensor by a weight tensor, and generates an output tensor. In the examples below, single variables will often be used for simplicity and clarity, but in real applications, each single variable can represent a higher-dimensional tensor and not just a singular numerical value.

The benefits are massive parallelism can be severely blunted by bad hardware utilization. Hardware utilization is a measure that quantifies the fraction of hardware devices that are used over any particular time period. Hardware utilization can be expressed using any appropriate metric, e.g., the fraction or percentage of tiles that are used for a particular layer.

Accelerator scheduling is the process by which layer operations are assigned to actual hardware devices to be performed at particular times. The general problem involves assigning portions of an input activation rectangle to portions of an array of tiles at particular points in time. In this specification, an activation rectangle is an array of input data. Each element of the activation rectangle includes activation data. For brevity each element of an activation rectangle may be referred to as a pixel, although as described above a pixel can be a tensor having multiple, and potentially many, features rather than being a single value.

FIG. 1A illustrates the basic problem of scheduling for a machine learning accelerator. An activation rectangle 110 has N rows and M columns. In this case, N is 10 and M is 8. Each pixel within the activation rectangle has 8 associated features, which are indicated by the 8 s in the activation rectangle 110.

The accelerator hardware 120 is an array of tiles, which generally also has rows and columns. In this specification, a column of tiles is a group of tiles that output data in parallel to a vector accumulator. Thus, if an accelerator has N rows and M columns, the accelerator can perform up to M MAC operations in parallel, with each MAC operation using computations from up to N tiles.

One prior art technique for accelerator scheduling involves distributing activations along columns and activation features along rows of the tile array. However, the utilization for this scheduling technique depends heavily on how closely the number of features matches the number of columns. If the activation data has 10 features and the accelerator has 32 columns, the utilization would only be 31.25%.

To increase the utilization, the accelerator could use a technique known as least column multiple scheduling by filling up the unused columns with additional activation features. However, this technique suffers from major drawbacks. The first is that there is no weight reuse, meaning that on every cycle uses a different feature and thus every tile has to use a different weight. In addition, there is no activation locality between layers, meaning that the output computed from one layer will not match the required location to be used as input for the next layer. Therefore, in practice, this technique requires performing a highly complex and expensive reshuffle of all the data on the chip between layers.

SUMMARY

This specification describes a machine learning accelerator that uses topological scheduling. With topological scheduling, the columns of the tile array are partitioned into wide columns, and the columns of the input activation rectangle are also partitioned into an equal number of wide columns. In this specification, a wide column is a group of two or more columns of a tile array or an activation rectangle. These two types of wide columns can thus be referred to as a either a tile wide column, for wide columns in the tile array; or a pixel wide column, for wide columns in the activation rectangle.

Topological scheduling then binds the tile wide columns and the pixel wide columns such that pixels belonging to one pixel wide column are processed by tiles in a corresponding tile wide column. Topological scheduling also distributes features of each pixel along the columns of a single column in the tile wide columns.

Particular embodiments of the subject matter described in this specification can be implemented so as to realize one or more of the following advantages. Using topological scheduling increases hardware utilization of grid-based machine-learning accelerators compared to prior art scheduling approaches. This reduces system latency and improves overall processing speed. Using topological scheduling also reduces conveyor bandwidth that is required to shuffle data within the device and obviates the need to perform complex reshuffling of data between layers of a machine learning model. The topological scheduling techniques also allow input activations to be read once and then shared among tiles along the same row of a wide column within a subrectangle of the entire grid, which reduces the data input latency and increases the overall effective data transfer bandwidth of the hardware.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

columns PWC0 through PWC3. Likewise, the accelerator hardware 120 is logically partitioned into tile wide columns TWC0 through TWC3. In FIG. 1B, it can be seen that maintaining the correspondence between pixel wide columns and tile wide columns results in the assignment of difference features from row 130 of the activation rectangle to tiles in the accelerator hardware 120.

In this example, the eight features F0 . . . F7 of pixel 00 have been assigned respectively to the tiles belonging to the 0th column of TWC0, the eight features F0 . . . F7 of pixel 01 have been assigned respectively to the tiles belonging to the 1st column of TWC0, and so on.

Figure 1A:
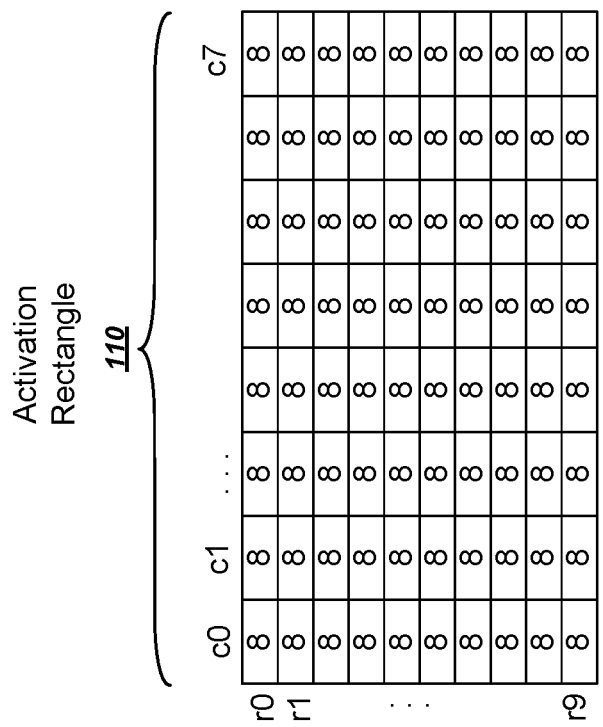
FIG. 1A illustrates the basic problem of scheduling for a machine learning accelerator.
Figure 1A:
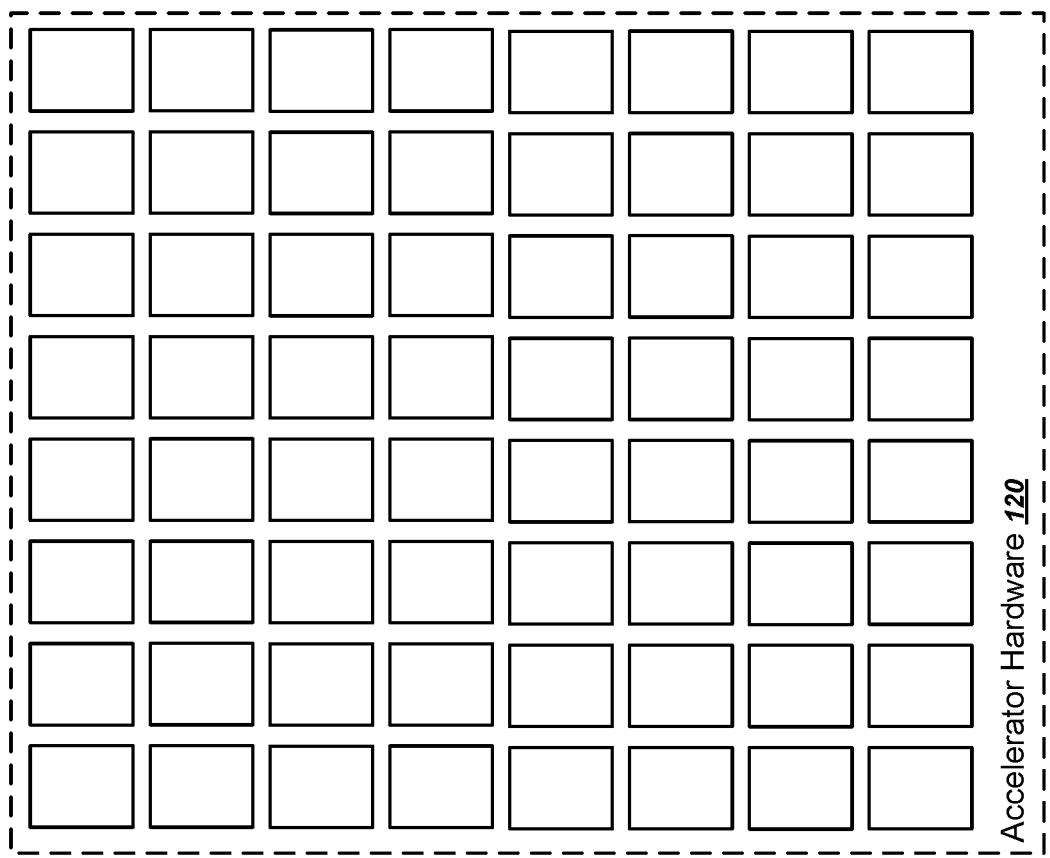
Figure 1B:
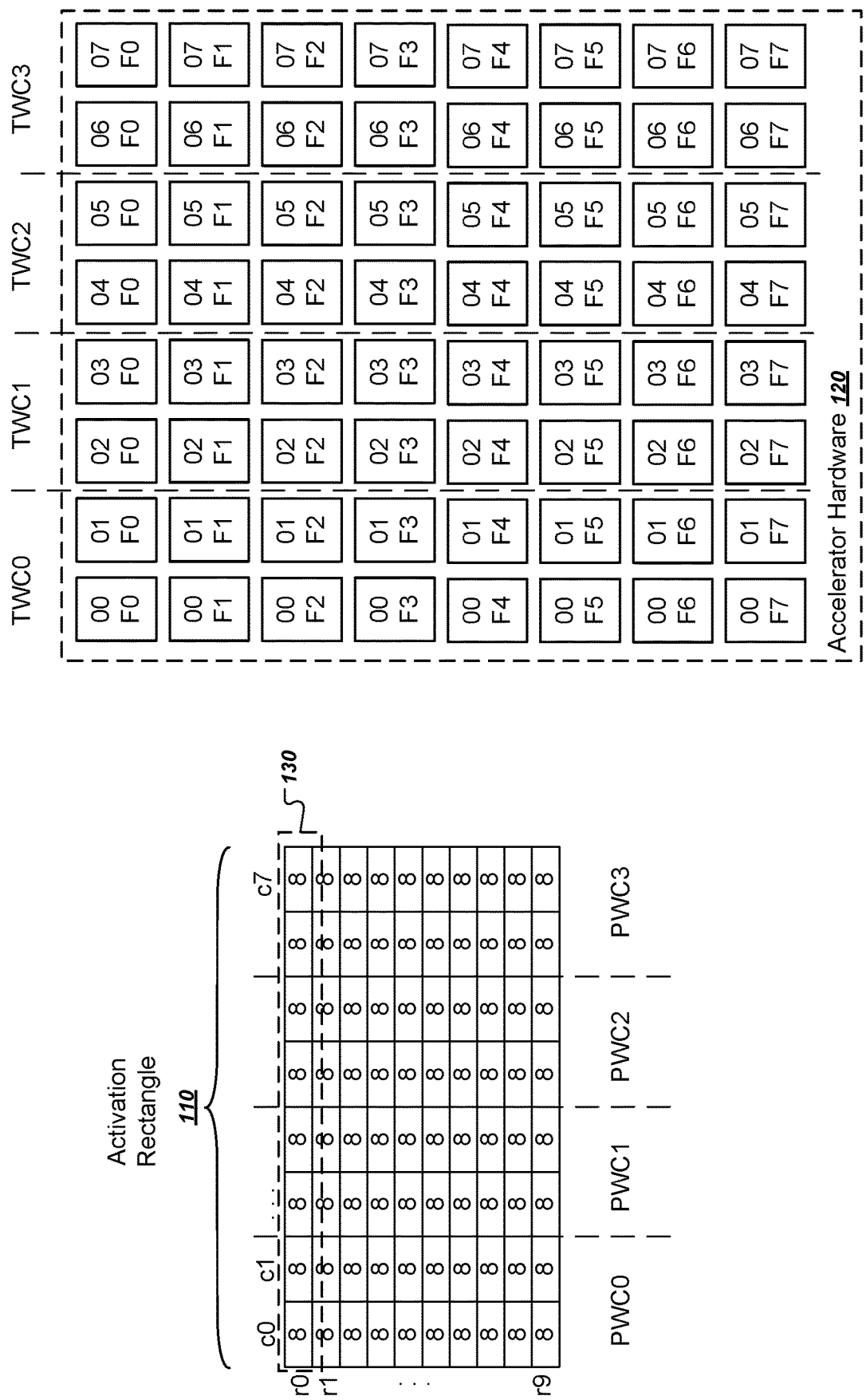
FIG. 1B illustrates a high-level view of the assignments of an example topological schedule.

The example in FIG. 1B illustrates an advantage of topological scheduling, which is that tiles having the same features are physically close to each other, which facilitates weight reuse. For example, tiles all along the top row of the accelerator hardware 120 all use the same weight for feature F0. Thus, much less data shuffling is required, which is a major advantage over least column multiple scheduling described above.

TABLES 1 and 2 illustrate another example of partitioning a tile array and a single row of an activation rectangle to have corresponding wide columns. This is an example in which the width of the tile wide columns and the width of the pixel wide columns are different.

In TABLE 1, TWC represents an index of a tile wide column, and Lng represents a chip longitude of a tile column in a chip having 16 tile columns.

TABLE 1

| TWC | 0 | | 1 | | 2 | | 3 | | 4 | | 5 | | 6 | | 7 | |
|-----|---|---|---|---|---|---|---|---|---|---|---|---|---|---|---|---|
| Lng | 0 | 1 | 2 | 3 | 4 | 5 | 6 | 7 | 8 | 9 | 10 | 11 | 12 | 13 | 14 | 15 |

In other words, the assignments in TABLE indicate that the tile columns of the accelerator have been divided into 8 wide columns. A topological schedule will then assign wide columns of the activation rectangle to respective wide columns of the tile array.

In TABLE 2, PWC represents an index of a pixel wide column, and represents a width location of a pixel in the activation rectangle:

TABLE 2

| | PWC | | | | | | | | | | | | | | | | | |
|---|---|---|---|---|---|---|---|---|---|---|---|---|---|---|---|---|---|---|
| | 0 | | | | 1 | | | | 2 | | | | 3 | | | | 4 | |
| $t_W$ | 0 | 1 | 2 | 3 | 0 | 1 | 2 | 3 | 0 | 1 | 2 | 3 | 0 | 1 | 2 | 3 | 0 | 1 |
| W | 0 | 1 | 2 | 3 | 4 | 5 | 6 | 7 | 8 | 9 | 10 | 11 | 12 | 13 | 14 | 15 | 16 | 17 |

| | PWC | | | | | | | | | | | | | | |
|---|---|---|---|---|---|---|---|---|---|---|---|---|---|---|---|---|
| | 4 | | 5 | | | | 6 | | | | 7 | | | | | |
| $t_W$ | 2 | 3 | 0 | 1 | 2 | 3 | 0 | 1 | 2 | 3 | 0 | 1 | 2 | 3 | | |
| W | 18 | 19 | 20 | 21 | 22 | 23 | 24 | 25 | 26 | 27 | 28 | 29 | 30 | 31 | | |

DETAILED DESCRIPTION

FIG. 1B illustrates a high-level view of the assignments of an example topological schedule. In this example, the activation rectangle 110 is logically partitioned into pixel wide Thus, each tile wide column is assigned 4 pixels each. The pixels assigned to each tile wide column will be processed sequentially in time at a time step represented by tw.

Figure 2:
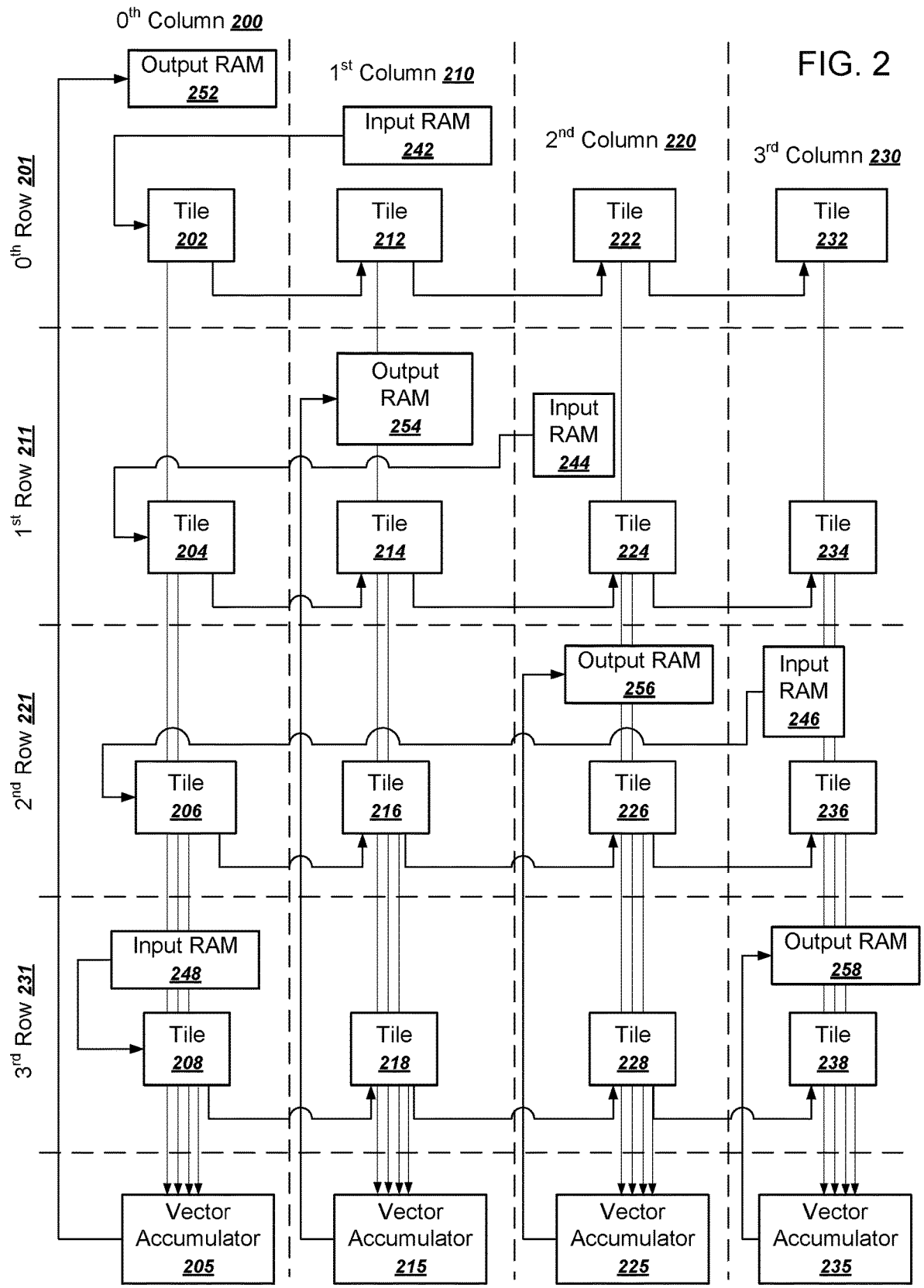
FIG. 2 is a diagram illustrating more hardware detail for implementing topological scheduling.

FIG. 2 is a diagram illustrating more hardware detail for implementing topological scheduling. FIG. 2 illustrates the hardware structures and data movements that are involved in a single tile wide column of a tile array.

FIG. 2 illustrates a single, tile wide column having four tile columns, with each column of tiles having four rows. Thus, a 0th column 200 includes tiles 202, 204, 206, and 208; a 1st column 210 includes tiles 212, 214, 216, and 218; a 2nd column 220 includes tiles 222, 224, 226, and 228; and a 3rd column 230 includes tiles 232, 234, 236, and 238. Each tile column also includes a respective vector accumulator, e.g., a vector accumulator 205 for the 0th column 200, a vector accumulator 215 for the 1st column 210, a vector accumulator 225 for the 2nd column 220, and a vector accumulator 235 for the 3rd column 230. Real-world implementations can have more than 4 rows and more than 4 columns per wide column. In operation, the features of the activation rectangle are distributed along tiles of a single tile column. Thus, for example, if each pixel has four features, these four features can be assigned respectively to tiles 202, 204, 206, and 208. If a pixel has more features than the number of rows in a tile column, the accelerator can compute the extra features on subsequent time steps. In this specification, a time step is any appropriate time period required for a device to compute layer operations for an input pixel. For example, each time step can be a time period required for the tiles in a column to compute their multiplications and for a corresponding vector accumulator to sum the results, apply one or more transformations to the result, and write the result to an output RAM. A time step can thus include one or more clock cycles.

At each time step, tiles in a single column perform a multiplication of an input activation by a respective weight for a respective feature. The results are then passed to a vector accumulator for the tile column. Thus, for example, the vector accumulator 205 receives multiplication results for tiles 202, 204, 206, and 208. In FIG. 2, all inputs along a column into the vector accumulator should be interpreted as originating from a respective tile and then bypassing all other tiles and RAMs. For illustrative ease, the lines representing such data movements have been illustrated behind these other devices. In a real-world implementation, these devices would not receive or manipulate the inputs to the vector accumulators.

The vector accumulator 205 then writes the result to an output RAM 252 situated at a location in the tile array having the following properties: the output RAM is in the same column as the vector accumulator and in the row at which it will be read on a subsequent layer of the network. In this example, the computations for the next layer will be read by tiles in the 0th row 201, and thus, the vector accumulator 205 writes the results to the output RAM 252 located on the 0th row 201.

In this context, a RAM being situated at a particular location in the tile array means that a tile at that location can read from the RAM without using conveyors. In this specification, conveyors are hardware connection devices that communicate data from one area to another on the physical accelerator. Conveyors typically require one or more time steps in order to effectuate the data transmission. But in this example, the tile 202 can read from the output RAM 252 without using conveyors, and therefore, the output RAM 252 is considered to be at the same location as the tile 202 for the purposes of topological scheduling. In other words, the logical boundaries of rows and columns in the tile array are defined by which elements need to use conveyors to communicate data.

As illustrated in FIG. 2, the operations of the topological schedule result in a diagonal pattern of input RAMs and output RAMs. This pattern emerges due to the dimensions of the device and the wide columns and the number of features in the input activations. FIG. 2 illustrates only those devices that contribute to the output for a single, wide column. But in a real-world implementation, an accelerator can actually have input RAMs and output RAMs at every location. At, at one or more of the locations, these input and output RAMs can actually be the same memory device.

On the next time step, the tiles in the 1st column 210 can compute their multiplications using their respective weights and features. This example illustrates one of the technological advantages of using topological scheduling, which is that tiles along a row of a wide column can share input activations. As illustrated in FIG. 2, the tile 202 in the 0th column 200 reads from the input RAM 242, and on the next time step, the tile 212 in the 1st column 210 reads the same input activation from the tile 202.

This means that the accelerator needs to load the input activation into the input RAM 242 only once, and then the input activation is shared with all other tiles in a row using the conveyor hardware. This design reduces the data bandwidth and memory latency compared to approaches that require reading input activations on every time step. In addition, the physical communication distance required for sharing of the input activations is small. As shown in FIG. 2, the tiles generally share input activations with a physically adjacent tile in the tile array.

Topological scheduling also improves activation locality compared to prior art approaches. In other words, storing the computation results at a row at which they will be consumed on the next layer reduces the need for full performing a full-chip reshuffle as described above regarding least column multiple scheduling. Thus, the usage of the conveyor hardware between layers is greatly reduced, which makes overall processing faster.

Because of this technique of storing output data at a row at which it will be used at a next layer, on some time steps it is necessary use the conveyor hardware to move the input activation over to the 0th column 200 before beginning computation. Thus, for example, the input activation in the input RAM 242 can be moved left in the time step before computation begins for the 0th column 200. All of these data movements can be prescheduled by the compiler for the accelerator so that all data movements precede all column-wise computations. Input RAMs that are stored farther away from the 0th column 200 may need to be moved farther distance, which may require additional time steps. for example, the input activation stored in the input RAM 246 needs to move three steps to the left before being used by the tile 206 in the 0th column 200. All of these precomputation data movements can be prescheduled by the compiler.

In order to support convolutions larger than 1×1, the accelerator can have additional conveyors that communicate the edges of the wide columns to adjacent wide columns whenever they are computed. For example, whenever a value is stored to the output RAM 252, the system can automatically propagate those output values to output RAMs located in one or both adjacent wide columns.

Figure 3:
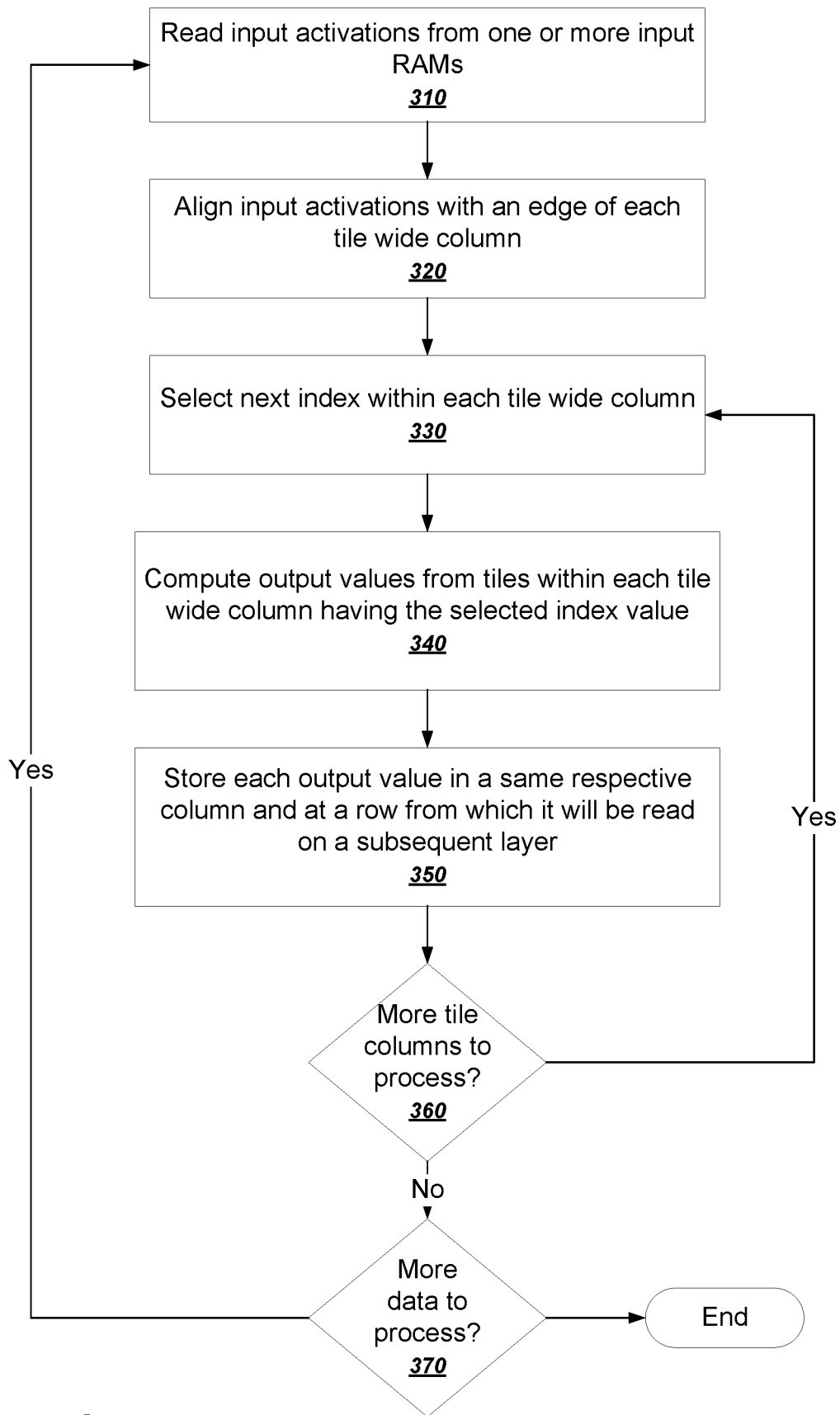
FIG. 3 is a flowchart of an example process for executing a topological schedule.

FIG. 3 is a flowchart of an example process for executing a topological schedule. The process will be described as being performed by a system having a tile array, e.g., a machine learning accelerator, partitioned into tile wide columns.

The system reads input activations from an input RAM (310). The input activations can be computed from a previous layer of a neural network and stored in the input RAM. The input activations can be computed by the same device or a different device. For example, a machine learning accelerator may have multiple arrays of tiles that compute different portions of layer operations.

The system aligns input activations with an edge of each tile wide column (320). As described above, the system can use conveyor hardware to move the input activation from the input RAM where it is stored to a same edge of each tile wide column. Some alignment operations may take longer than others, so they system can wait until all input activations are aligned at the same edge of the tile wide column.

The system selects a next index value within each tile wide column (330). As described above, within each tile wide column, the system can iterate over each tile column on each time step.

The system computes, in parallel, output values from tiles within each tile wide column having the selected index value (340). For example, if the index value is 0, the device can process each 0th tile column within each fat column in parallel.

The system stores each output value in a same respective column and at a row from which it will be read on a subsequent layer (350). As described above, the system can identify an output RAM on the same column that the output value was computed and on a row from which the value will be read on a subsequent layer.

The system determines if there are more tile columns to process in each tile wide column (360). If so, the system selects a next index within each tile wide column (branch to 330).

If not, the system determines whether there is more activation data to process (370). If so, the system returns to read the new activations from one or more input RAMs (branch to 310). For example, the system can load input activations and feature values for other pixels from the activation rectangle until all data in the activation rectangle has been processed.

If all data has been processed, the process ends (branch to end).

Figure 4:
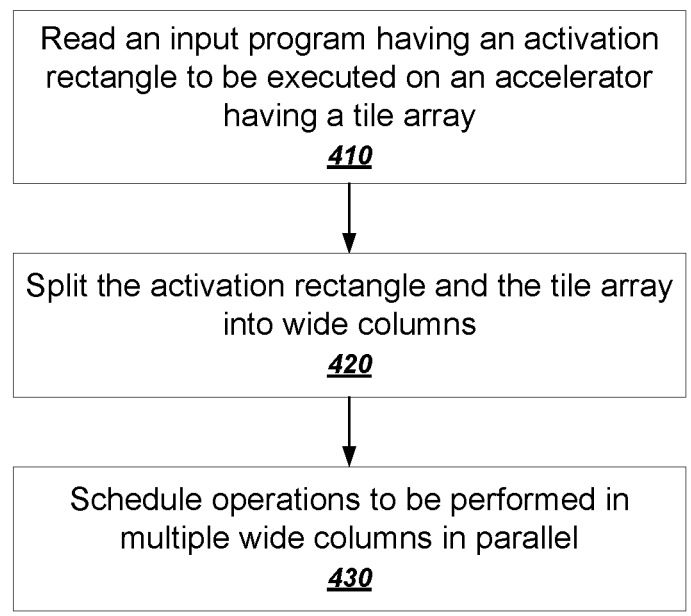
FIG. 4 is a flowchart of an example process for generating a topological schedule.

FIG. 4 is a flowchart of an example process for generating a topological schedule. The example process can be performed by a compiler installed on any appropriate computing system having one or more computers in one or more locations. For convenience, the example process will be described as being performed by a system of one or more computers.

The system receives an input program having an activation rectangle to be executed on an accelerator having a tile array (410). As described above, the input program can define the architecture and operations of a neural network having multiple layers.

The system splits the activation rectangle and the tile array into wide columns and associates each tile wide column with a corresponding pixel wide column (420). For example, the system can split both the activation rectangle and the tile array into an equal number of wide columns. In general, the wideness of a column is two or greater less than half of the width of either the activation rectangle or the tile array. The "wideness" of each wide column is a parameter that can be chosen to optimize performance. Choosing smaller wideness values increases the throughput of the chip, but also requires store more copies of weights, more padding of the activation rectangle, and reduced read activation sharing between tiles.

The system schedules operations to be performed in multiple wide columns in parallel (430). As described above, at each time step the system computes operations for a single tile column within each of the wide columns. Thus, the system can preschedule all of these operations according to the wide columns of the tile array. It is quite common to require multiple passes through a tile array in order to compute all the data from the activations. For example, as illustrated in FIG. 1B, the tile array in that example was able to compute only a single row from the activation rectangle. Thus, the system can schedule additional operations in order to process subsequent portions of the activation rectangle. In some implementations, the number of features may exceed the number of rows of the tile array. In that situation, the system can add additional inner loops so that multiple time steps are used to process all the features of each input pixel.

The above description of scheduling can be formalized into the following constraints that can be used by a compiler in order to assign layer operations to tiles.

1) The latitude of an input RAM from layer 1-1 is equal to the latitude of a tile for layer 1.

2) The longitude of each tile is equal to the longitude of the vector accumulator that will compute a sum from the tile's output.

3) The longitude of the output RAM for layer 1 is equal to the longitude of the tiles that computed values contributing to the result.

In some implementations, a machine learning accelerator can be partitioned into multiple independent partitions. In that case, the system can impose additional constraints on the scheduling process that essentially state that partitions cannot change when computing results adhering to a topological schedule. In addition, some machine learning accelerator columns are actually super columns having multiple internal tile columns. In those devices, the system can also impose additional constraints on the index of the internal tile columns.

Figure 5:
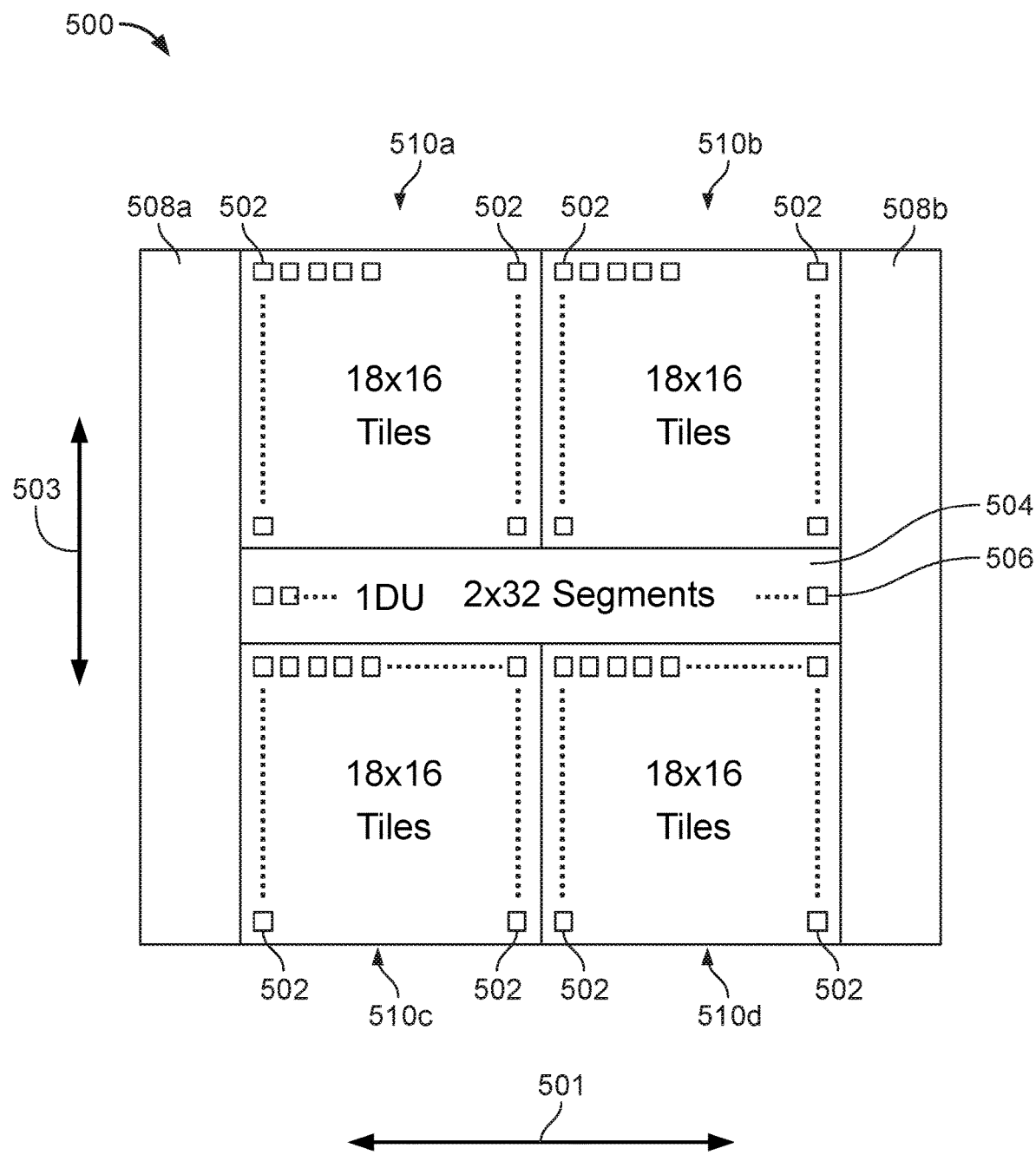
FIG. 5 is a schematic that illustrates an example of special purpose logic circuitry.

FIG. 5 is a schematic that illustrates an example of special purpose logic circuitry, in particular, an ASIC 500. The ASIC 500 includes multiple synchronous processors that for brevity will be referred to as tiles. For example, the ASIC 500 includes tiles 502, in which one or more of the tiles 502 includes special purpose circuitry configured to perform synchronous computations, such as e.g., multiplication and addition operations. In particular, each tile 502 can include a computational array of cells, in which each cell is configured to perform mathematical operations (see, e.g., the exemplary tile 200 shown in FIG. 6, and described herein). In some implementations, the tiles 502 are arranged in a grid pattern, with tiles 502 arranged along a first dimension 501 (e.g., rows) and along a second dimension 503 (e.g., columns). For instance, in the example shown in FIG. 5, the tiles 502 are divided into four different sections (510a, 510b, 510c, 510d), each section containing 288 tiles arranged in a grid of 18 tiles down by 16 tiles across. In some implementations, the ASIC 500 shown in FIG. 5 may be understood as including a single systolic array of cells subdivided/arranged into separate tiles, in which each tile includes a subset/sub-array of cells, local memory and bus lines (see, e.g., FIG. 6).

The ASIC 500 also includes a vector processing unit 504. The vector processing unit 504 includes circuitry configured to receive outputs from the tiles 502 and compute vector computation output values based on the outputs received from the tiles 502. For example, in some implementations, the vector processing unit 504 includes circuitry (e.g., multiply circuitry, adder circuitry, shifters, and/or memory) configured to perform accumulation operations on the outputs received from the tiles 502. Alternatively, or in addition, the vector processing unit 504 includes circuitry configured to apply a non-linear function to the outputs of the tiles 502.

Alternatively, or in addition, the vector processing unit 504 generates normalized values, pooled values, or both. The vector computation outputs of the vector processing units can be stored in one or more tiles. For example, the vector computation outputs can be stored in memory uniquely associated with a tile 502. Alternatively, or in addition, the vector computation outputs of the vector processing unit 504 can be transferred to a circuit external to the ASIC 500, e.g., as an output of a computation. In some implementations, the vector processing unit 504 is segmented, such that each segment includes circuitry configured to receive outputs from a corresponding collection of tiles 502 and computes vector computation outputs based on the received outputs. For instance, in the example shown in FIG. 5, the vector processing unit 504 includes two rows spanning along the first dimension 501, each of the rows including 32 segments 506 arranged in 32 columns. Each segment 506 includes circuitry (e.g., multiply circuitry, adder circuitry, shifters, and/or memory) configured to perform a vector computation, as explained herein, based on outputs (e.g., an accumulated sum) from a corresponding column of tiles 502. The vector processing unit 504 can be positioned in the middle of the grid of tiles 502 as shown in FIG. 5. Other positional arrangements of the vector processing unit 504 are also possible.

The ASIC 500 also includes a communication interface 508 (e.g., interfaces 508a, 508b). The communication interface 508 includes one or more sets of serializer/deserializer (SerDes) interfaces and a general purpose input/output (GPIO) interface. The SerDes interface is configured to receive instructions (e.g., instructions for operating controllable bus lines described below) and/or input data for the ASIC 500 and to output data from the ASIC 500 to an external circuit. For example, the SerDes interface can be configured to transmit instructions and/or input data at a rate of 32 Gbps, 56 Gbps, or any suitable data rate over the set of SerDes interfaces included within the communications interface 508. The GPIO interface is configured to provide an interface for debugging and/or bootstrapping. For example, the ASIC 500 may run a boot program when it is turned on. If the program fails, an administrator may use the GPIO interface to debug the source of the failure.

The ASIC 500 further includes multiple controllable bus lines (see, e.g., FIG. 6) configured to convey data among the communications interface 508, the vector processing unit 504, and the multiple tiles 502. Controllable bus lines include, e.g., wires that extend along both the first dimension 501 (e.g., rows) of the grid and the second dimension 503 (e.g., columns) of the grid. A first subset of the controllable bus lines extending along the first dimension 501 can be configured to transfer data in a first direction (e.g., to the right of FIG. 5). A second subset of the controllable bus lines extending along the first dimension 501 can be configured to transfer data in a second direction (e.g., to the left of FIG. 5). A first subset of the controllable bus lines extending along the second dimension 503 can be configured to transfer data in a third direction (e.g., to the top of FIG. 5). A second subset of the controllable bus lines extending along the second dimension 503 can be configured to transfer data in a fourth direction (e.g., to the bottom of FIG. 5).

Each controllable bus line includes multiple conveyer elements, such as flip-flops, that are used to convey data along the lines in accordance with a clock signal. Transferring data over a controllable bus line can include shifting, at each clock cycle, data from a first conveyer element of the controllable bus line to a second adjacent conveyer element of the controllable bus line. In some implementations, data is conveyed over the controllable bus lines upon the rising or falling edge of a clock cycle. For example, data present, at a first clock cycle, on a first conveyer element (e.g., a flip-flop) of a controllable bus line can be transferred to a second conveyer element (e.g., a flip-flop) of the controllable bus line at a second clock cycle. In some implementations, the conveyer elements can be periodically spaced apart at a fixed distance from one another. For example, in some cases, each controllable bus line includes multiple conveyer elements, with each conveyer element positioned within or proximate to a corresponding tile 502.

Each controllable bus line also includes multiple multiplexers and/or demultiplexers. A multiplexer/demultiplexer of a controllable bus line is configured to transfer data between the bus line and a component of the ASIC chip 500. For example, a multiplexer/demultiplexer of a controllable bus line can be configured to transfer data to and/or from a tile 502, to and/or from the vector processing unit 504, or to and/or from the communication interface 508. Transferring data among tiles 502, the vector processing unit 504, and the communication interface can include sending control signals to the multiplexers based on the desired data transfer to take place. The control signals can be stored in registers coupled directly to the multiplexer and/or demultiplexers. The value of the control signal then may determine, e.g., what data is transferred from a source (e.g., memory within a tile 502 or a vector processing unit 504) to a controllable bus line or, alternatively, what data is transferred from the controllable bus line to a sink (e.g., memory within a tile 502 or a vector processing unit 504).

The controllable bus lines are configured to be controlled on a local level, such that each tile, vector processing unit, and/or communication interface includes its own set of control elements for manipulating the controllable bus lines passing through that tile, vector processing unit, and/or communication interface. For example, each tile, 1D vector processing unit, and communication interface may include a corresponding set of conveyer elements, multiplexers and/or demultiplexers for controlling data transfer to and from that tile, 1D vector processing unit, and communication interface.

To minimize latency associated with operations of the ASIC chip 500, the tiles 502 and vector processing unit 504 can be positioned to reduce the distance data travels among the various components. In a particular implementation, both the tiles 502 and communication interface 508 can be segregated into multiple sections, with both the tile sections and the communication interface sections being arranged such that the maximum distance data travels between a tile and a communication interface is reduced. For instance, in some implementations, a first group of tiles 502 can be arranged in a first section on a first side of the communications interface 508, and a second group of tiles 502 can be arranged in a second section on a second side of the communication interface. As a result, the distance from a communication interface to the furthest tile may be cut in half compared to a configuration in which all of the tiles 502 are arranged in a single section on one side of the communication interface.

Alternatively, the tiles may be arranged in a different number of sections, such as four sections. For instance, in the example shown in FIG. 5, the multiple tiles 502 of ASIC 500 are arranged in multiple sections 510 (510a, 510b, 510c, 510d). Each section 510 includes a similar number of tiles 502 arranged in a grid pattern (e.g., each section 510 can include 256 tiles arranged in 16 rows and 16 columns). The communication interface 508 also is divided into multiple sections: a first communication interface 508a and a second communication interface 508b arranged on either side of the sections 510 of tiles 502. The first communication interface 508a can be coupled, through controllable bus lines, to the two tile sections 510a, 510c on the left side of the ASIC chip 500. The second communication interface 508b can be coupled, through controllable bus lines, to the two tile sections 510b, 510d on the right side of the ASIC chip 500. As a result, the maximum distance data travels (and thus the latency associated with the data propagation) to and/or from a communication interface 508 can be halved compared to an arrangement in which only a single communication interface is available. Other coupling arrangements of the tiles 502 and communication interfaces 508 are also possible to reduce data latency. The coupling arrangement of the tiles 502 and communication interface 508 can be programmed by providing control signals to the conveyer elements and multiplexers of the controllable bus lines.

In some implementations, one or more tiles 502 are configured to initiate reading and writing operations with respect to controllable bus lines and/or other tiles within the ASIC 500 (referred to herein as "control tiles"). The remaining tiles within the ASIC 500 can be configured to perform computations based on the input data (e.g., to compute layer inferences). In some implementations, the control tiles include the same components and configuration as the other tiles within the ASIC 500. The control tiles can be added as an extra tile or tiles, an extra row or rows, or an extra column or columns of the ASIC 500. For example, for a symmetric grid of tiles 502, in which each tile 502 is configured to perform a computation on input data, one or more additional rows of control tiles can be included to handle reading and writing operations for the tiles 502 performing computations on the input data. For instance, each section 510 includes 18 rows of tiles, where the last two rows of tiles may include control tiles. Providing separate control tiles increases, in some implementations, the amount of memory available in the other tiles used to perform the computations. Separate tiles dedicated to providing control as described herein are not necessary, however, and in some cases, no separate control tiles are provided. Rather, each tile may store in its local memory instructions for initiating reading and writing operations for that tile.

Furthermore, while each section 510 shown in FIG. 5 includes tiles arranged in 18 rows by 16 columns, the number of tiles 502 and their arrangement in a section can be different. For example, in some cases, the sections 510 may include an equal number of rows and columns.

Furthermore, although shown in FIG. 5 as divided into four sections, the tiles 502 can be divided into other different groupings. For example, in some implementations, the tiles 502 are grouped into two different sections, such as a first section above the vector processing unit 504 (e.g., nearer the top of the page shown in FIG. 5) and a second section below the vector processing unit 504 (e.g., nearer to the bottom of the page shown in FIG. 5). In such an arrangement, each section may contain, e.g., 576 tiles arranged in a grid of 18 tiles down (along direction 503) by 32 tiles across (along direction 501). Sections may contain other total numbers of tiles and may be arranged in different sized arrays. In some cases, the divisions between sections are delineated by hardware features of the ASIC 500. For example, as shown in FIG. 5, sections 510a, 510b may be separated from sections 510c, 510d by the vector processing unit 504.

Latency also may be reduced by centrally locating the vector processing unit 504 relative to the tile sections 510. In some implementations, a first half of the tiles 502 are arranged on a first side of the vector processing unit 504, and a second half of the tiles 502 are arranged on a second side of the vector processing unit 504.

For example, in the ASIC chip 500 shown in FIG. 5, the vector processing unit 504 includes two sections (e.g., two rows), each of which includes a number of segments 506 that matches the number of columns of tiles 502. Each segment 506 can be positioned and configured to receive an output, such as an accumulated sum, from a corresponding column of tiles 502 within a section 510 of tiles. In the example shown in FIG. 5, the tile sections 510a, 510b positioned on a first side of the vector processing unit 504 (e.g., above the vector processing unit 504) can be coupled, through controllable bus lines, to the top row of segments 506. The tile sections 510c, 510d positioned on a second side of the vector processing unit 504 (e.g., below the vector processing unit 504) can be coupled, through controllable bus lines, to the bottom row of segments 506. Furthermore, each tile 502 within the first half above the processing unit 504 can be positioned at a same distance from the vector processing unit 504 as a respective tile 502 within the second half below the processing unit 504, such that there is no difference in overall latency between the two halves. For instance, the tiles 502 in row i in the first section 510a (where the variable i corresponds to the row position) can be positioned at the same distance away from vector processing unit 504 as the tiles 502 in row m−1−i in a second section of tiles (e.g., the section 510c) (where m represents the total number of rows in each section, and assuming rows are incremented along the same direction in both sections).

Configuring the tile sections 510 in this manner can halve the distance data travels (and thus the latency associated with the data propagation) to and/or from the vector processing unit 504 compared to an arrangement in which the vector processing unit 504 is positioned at a far end (e.g., the bottom) of all the tiles 502. For instance, the latency associated with receiving an accumulated sum through a column of tiles 502 from section 510a can be half the latency associated with receiving an accumulated sum through a column of tiles 502 from sections 510a and 510c. The coupling arrangements of the tiles 502 and the vector processing unit 504 can be programmed by providing control signals to the conveyer elements and multiplexers of the controllable bus lines.

During operation of the ASIC chip 500, activation inputs may be shifted between tiles. For example, activation inputs can be shifted along the first dimension 501. In addition, outputs from computations performed by the tiles 502 (e.g., outputs of computations performed by computational array within the tile 502) can be shifted along the second dimension 503 between tiles.

In some implementations, the controllable bus lines can be physically hardwired to cause data to skip tiles 502 to reduce latency associated with the operations of the ASIC chip 500. For example, an output of a computation performed by a first tile 502 can be shifted along the second dimension 503 of the grid to a second tile 502 positioned at least one tile away from the first tile 502, thus skipping the tile in between. In another example, an activation input from a first tile 502 can be shifted along the first dimension 501 of the grid to a second tile 502 positioned at least one tile away from the first tile 502, thus skipping the tile in between. By skipping at least one tile when shifting the activation input or the output data, the overall data path length can be reduced, such that the data is transferred faster (e.g., there is no need to utilize a clock cycle to store data at the skipped tile), and latency is reduced.

In an example implementation, each tile 502 within each column of section 510a can be configured, through the controllable bus lines, to pass output data along the second dimension 503 toward the vector processing unit 504. The tiles 502 within each column can be further configured to pass the data toward the vector processing unit 504 by skipping the next adjacent tile (e.g., through physical hardwiring of the controllable bus lines between tiles). That is, a tile 502 at a position (i, j)=(0, 0) in the first section 510a (where the variable i corresponds to the row position and the variable j corresponds to the column position) can be hardwired to pass output data to a tile 502 at a position (i, j)=(2, 0); similarly, the tile 502 at a position (i, j)=(2, 0) in the first section 510a can be hardwired to pass output data to a tile 502 at a position (i, j)=(4, 0), and so forth. The last tile that is not skipped (e.g., the tile 502 located at position (i, j)=(16, 0)) passes output data to the vector processing unit 504. For a section 510 having 18 rows of tiles, such as the example shown in FIG. 5, the tile skipping ensure that all tiles within a section 510 are at most 9 "tile hops" away from the vector processing unit 504, thus improving the ASIC chip 500 performance by reducing the data path length and resulting data latency by half.

In another example implementation, each tile 502 within each row of sections 510a, 510c and within each row of sections 510b, 510d can be configured, through the controllable bus lines, to pass activation inputs along the first dimension 501. For example, some tiles within the sections 510a, 510b, 510c, 510d can be configured to pass activation inputs toward a center of the grid 500 or toward the communication interfaces 508. The tiles 502 within each row can be further configured skip adjacent tiles, e.g., by hardwiring the controllable bus lines between tiles. For example, a tile 502 at a position (i, j)=(0, 0) in the first section 510a (where the variable i corresponds to the row position and the variable j corresponds to the column position) can be configured to pass activation inputs to a tile 502 at a position (i, j)=(0, 2); similarly, a tile 502 at a position (i, j)=(0, 2) in the first section 510a can be configured to pass activation inputs to a tile 502 at a position (i, j)=(0, 4), and so forth. In some cases, the last tile that is not skipped (e.g., the tile 502 located at position (i, j)=(0, 14)) does not pass the activation input on to another tile.

Similarly, tiles that are skipped may pass activation inputs in the opposite direction. For example, a tile 502 at a position (i, j)=(0, 15) in the first section 510a (where the variable i corresponds to the row position and the variable j corresponds to the column position) can be configured to activation inputs to a tile 502 at a position (i, j)=(0, 13); similarly, a tile 502 at a position (i, j)=(0, 13) in the first section 510a can be configured to pass activation inputs to a tile 502 at a position (i, j)=(0, 11), and so forth. In some cases, the last tile that is not skipped (e.g., the tile 502 located at position (i, j)=(0, 1)) does not pass the activation input on to another tile. By skipping tiles, it is possible, in some implementations, to improve the ASIC chip 500 performance by reducing the data path length and resulting data latency by half.

As explained herein, in some implementations, one or more of the tiles 502 are dedicated to storing control information. That is, the tiles 502 dedicated to storing control information do not take part in performing calculations on input data such as weight inputs and activation inputs. Control information can include, e.g., control data for configuring the controllable bus lines during operation of the ASIC chip 500 so that data can be moved around the ASIC chip 500. The control data can be provided to the controllable bus lines in the form of control signals for controlling the conveyer elements and multiplexers of the controllable bus lines. The control data specifies whether particular conveyer elements of the controllable bus lines pass data to a next conveyer element of the controllable bus line so that data is transferred among the tiles according to a predetermined schedule. The control data additionally specifies whether data is transferred from or to a bus line. For example, the control data can include control signals that direct a multiplexer to transfer data from a bus line to memory and/or other circuitry within a tile. In another example, the control data can include control signals that direct a multiplexer to transfer data from the memory and/or circuitry within the tile to the bus line. In another example, the control data can include control signals that direct a multiplexer to transfer data between a bus line and the communications interface 508 and/or between the bus line and the vector processing unit 504. Alternatively, as disclosed herein, dedicated control tiles are not used. Rather, in such cases, the local memory of each tile stores the control information for that particular tile.

Figure 6:
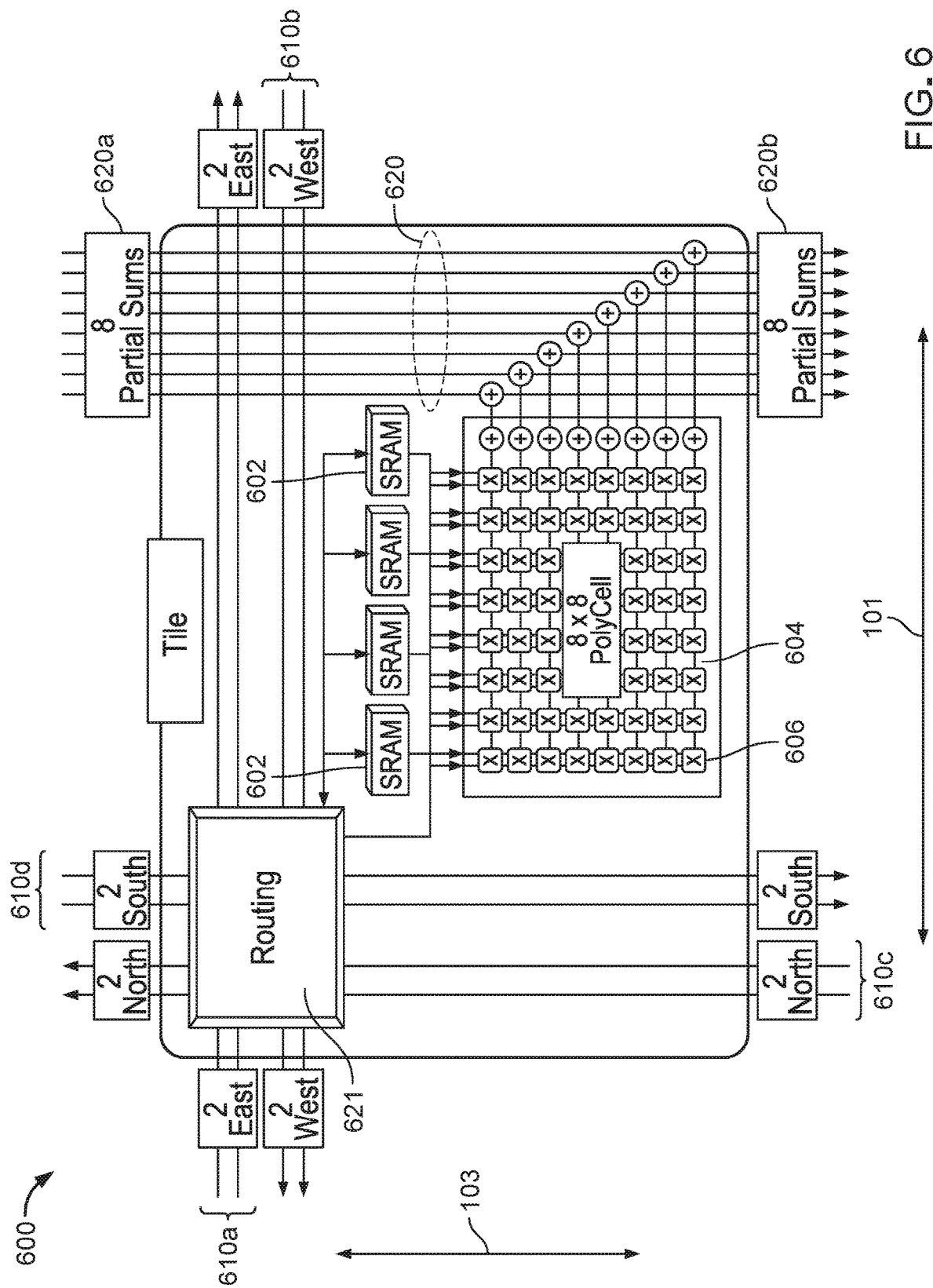
FIG. 6 illustrates example of a tile for use in a machine learning accelerator.

FIG. 6 illustrates example of a tile 600 for use in the ASIC chip 500. Each tile 600 includes local memory 602 and a computational array 604 coupled to the memory 602. The local memory 602 includes physical memory positioned proximate to the computational array 604. The computational array 604 includes multiple cells 606. Each cell 606 of the computational array 604 includes circuitry configured to perform a computation (e.g., a multiply and accumulate operation) based on data inputs, such as activation inputs and weight inputs, to the cell 606. Each cell can perform the computation (e.g., the multiply and accumulation operation) on a cycle of the clock signal. The computational array 604 can have more rows than columns, more columns than rows, or an equal number of columns and rows. For instance, in the example shown in FIG. 6, the computational array 604 includes 64 cells arranged in 8 rows and 8 columns. Other computational array sizes are also possible, such as computational arrays having 16 cells, 32 cells, 128 cells, or 256 cells, among others. Each tile can include the same number of cells and/or the same size computational array. The total number of operations that can be performed in parallel for the ASIC chip then depends on the total number of tiles having the same size computational array within the chip. For example, for the ASIC chip 500 shown in FIG. 5, which contains approximately 1150 tiles, this means that approximately 72,000 computations can be performed in parallel every cycle. Examples of clock speeds that may be used include, but are not limited to, 225 MHz, 500 MHz, 750 MHz, 1 GHz, 1.25 GHz, 1.5 GHz, 1.75 GHz, or 2 GHz. The computational arrays 604 of each individual tile is a subset of the larger systolic array of tiles, as illustrated in FIG. 1.

The memory 602 contained in the tile 600 can include, e.g., random-access memory (RAM), such as SRAM. Each memory 602 can be configured to store $(1/n)^{th}$ of the total memory associated with n tiles 502 of the ASIC chip illustrated in FIG. 5. The memory 602 can provided as a single chip or in multiple chips. For example, memory 602 shown in FIG. 6 is provided as four single-port SRAMs, each of which is coupled to the computational array 604. Alternatively, the memory 602 can be provided as two single-port SRAMs or eight single-port SRAMs, among other configurations. The joint capacity of the memory can be, but is not limited to, e.g., 16 kB, 32 kB, 64 kB, or 128 kB, after error correction coding. By providing the physical memory 602 locally to the computational arrays, the density of wiring for the ASIC 500 can be, in some implementations, vastly reduced. In an alternate configuration in which memory is centralized within the ASIC 500, as opposed to provided locally as described herein, may require a wire for each bit of memory bandwidth. The total number of wires needed to cover each tile of the ASIC 500 would far exceed the available space within the ASIC 100. In contrast, with dedicated memory provided for each tile, the total number of required to span the area of the ASIC 500 can be substantially reduced.

The tile 600 also includes controllable bus lines. The controllable bus lines may be categorized into multiple different groups. For example, the controllable bus lines can include a first group of general purpose controllable bus lines 610 configured to transfer data among tiles in each cardinal direction. That is, the first group of controllable bus lines 610 can include: bus lines 610a configured to transfer data toward a first direction along the first dimension 501 of the grid of tiles (referred to as "East" in FIG. 6); bus lines 610b configured to transfer data toward a second direction along the first dimension 101 of the grid of tiles (referred to as "West" in FIG. 6), in which the second direction is opposite to that of the first direction; bus lines 610c configured to transfer data toward a third direction along the second dimension 103 of the grid of tiles (referred to as "North" in FIG. 6); and bus lines 610d configured to transfer data toward a fourth direction along the second dimension 103 of the grid of tiles (referred to as "South" in FIG. 6), in which the fourth direction is opposite to the third direction. General purpose bus lines 610 can be configured to carry control data, activation input data, data from and/or to the communications interface, data from and/or to the vector processing unit, and data to be stored and/or used by the tile 600 (e.g., weight inputs). The tile 600 may include one or more control elements 621 (e.g., flip-flops and multiplexers) for controlling the controllable bus lines, and thus routing data to and/or from the tile 600 and/or from memory 602.

The controllable bus lines also can include a second group of controllable bus lines, referred to herein as computational array partial sum bus lines 620. The computational array partial sum bus lines 620 can be configured to carry data output from computations performed by the computational array 604. For example, the bus lines 620 can be configured to carry partial sum data obtained from the rows in the computational array 604, as shown in FIG. 6. In such case, the number of bus lines 620 would match the number of rows in the array 604. For instance, for a 8×8 computational array, there would be 8 partial sum bus lines 620, each of which is coupled to the output of a corresponding row in the computational array 604. The computational array output bus lines 620 can be further configured to couple to another tile within the ASIC chip, e.g., as inputs to a computational array of another tile within the ASIC chip. For example, the array partial sum bus lines 620 of tile 600 can be configured to receive inputs (e.g., partial sums 620a) of a computational array of a second tile that is located at least one tile away from the tile 600. The outputs of computational array 604 then are added to the partial sum lines 620 to produce new partial sums 620b, which may be output from the tile 600. The partial sums 620b then may be passed to another tile or, alternatively, to the vector processing unit. For example, each bus line 620 may be coupled to a corresponding segment (such as segments 506 in FIG. 5) of the vector processing unit.

As explained with respect to FIG. 5, the controllable bus lines can include circuitry such as conveyer elements (e.g., flip-flops) configured to allow data to be conveyed along the bus lines. In some implementations, each controllable bus line includes, for each tile, a corresponding conveyer element. As further explained with respect to FIG. 5, the controllable bus lines can include circuitry such as multiplexers configured to allow data to be transferred among the different tiles, the vector processing unit and the communications interface of the ASIC chip. The multiplexers can be located wherever there is a source or sink for data. For example, in some implementations, as shown in FIG. 6, control circuitry 621, such as multiplexers, can be located at crossings of controllable bus line (e.g., at the crossing of general purpose bus lines 610a and 610d, at the crossing of general purpose bus lines 610a and 610c, at the crossing of general purpose bus lines 610b and 610d, and/or at the crossing of general purpose bus lines 610b and 610c). The multiplexers at the bus line crossings can be configured to transfer data between the bus lines at the crossings. Accordingly, by proper operation of the multiplexers, it can be possible to change the direction in which data travels over the controllable bus lines. For example, data traveling along the first dimension 101 on general purpose bus lines 610a can be transferred to general purpose bus lines 610d, such that the data instead travels along the second dimension 103. In some implementations, multiplexers can be located adjacent to the memory 602 of the tile 600 so that data can be transferred to and/or from memory 602.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a device comprising:
a tile array comprising a plurality of tiles; and
a plurality of input RAMs, and a plurality of output RAMs, wherein the device is configured to perform operations comprising:
receiving a plurality of input activations for a first layer of a model;
performing, at each time step of a plurality of time steps corresponding respectively to columns within each of a plurality of wide columns of the tile array, operations comprising:
performing respective multiplications using tiles in a respective tile column for the time step, computing a respective output result for each respective tile column for the time step including computing a sum of results of the multiplications for the tile column, and storing the respective output result for the tile column in a particular output RAM having a location within the same tile column and on a row from which the output result will be read by a subsequent layer of the model.

Embodiment 2 is device of embodiment 1, wherein multiplications along a tile column are multiplications of different features of a respective input activation.

Embodiment 3 is the device of any one of embodiments 1-2, wherein each wide column of the tile array comprises multiple tile columns of the tile array.

Embodiment 4 is the device of any one of embodiments 1-3, wherein the operations further comprise aligning input activations along an edge of each tile wide column.

Embodiment 5 is the device of embodiment 4, wherein aligning the input activations comprises aligning the input activations before performing any of the multiplications.

Embodiment 6 is the device of any one of embodiments 1-5, wherein the device is a machine-learning accelerator.

Embodiment 7 is the device of any one of embodiments 1-6, wherein computing the respective output result is performed by a vector accumulator that is configured to compute an accumulated sum from respective multiplication results along a single tile column.

Embodiment 8 is the device of any one of embodiments 1-7, wherein the device is configured to read each of the plurality of input activations only once.

Embodiment 9 is the device of embodiment 8, wherein the device is configured to use conveyor hardware to share each input activation with other tiles in a same row of a wide column.

Embodiment 10 is a method comprising performing the operations performed by the device of any one of embodiments 1-9.

Embodiment 11 is a computer storage medium encoded with a computer program, the program comprising instructions that are operable, when executed by data processing apparatus, to cause the data processing apparatus to perform the operations of any one of embodiments 1-10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A device comprising:
a tile array comprising a plurality of tiles; and
a plurality of input RAMs, and a plurality of output RAMs, wherein the device is configured to perform operations comprising:
receiving a plurality of input activations for a first layer of a model; and
performing, at each time step of a plurality of time steps corresponding respectively to operations performed on tile columns within each tile column of a plurality of tile wide columns of the tile array, the operations comprising:
distributing different feature values of a respective single input activation location along the tile column of a respective tile wide column,
performing respective multiplications using a same respective weight for tiles in the respective tile column for the time step,
computing a respective output result for each respective tile column for the time step including computing a sum of results of the multiplications for the tile column, and
storing the respective output result for the tile column in a particular output RAM having a location within the same tile column and on a row from which the output result will be read by a subsequent layer of the model.

2. The device of claim 1, wherein multiplications along a tile column are multiplications of different features of a respective input activation.

3. The device of claim 1, wherein each wide column of the tile array comprises multiple tile columns of the tile array.

4. The device of claim 1, wherein the operations further comprise aligning input activations along an edge of each tile wide column of the plurality of tile wide columns of the tile array.

5. The device of claim 4, wherein aligning the input activations comprises aligning the input activations before performing any of the multiplications.

6. The device of claim 1, wherein the device is a machine-learning accelerator.

7. The device of claim 1, wherein computing the respective output result is performed by a vector accumulator that is configured to compute an accumulated sum from respective multiplication results along a single tile column.

8. The device of claim 1, wherein the device is configured to read each of the plurality of input activations only once.

9. The device of claim 8, wherein the device is configured to use conveyor hardware to share each input activation with other tiles in a same row of a wide column.

10. A method performed by a device comprising:
a tile array comprising a plurality of tiles; and
a plurality of input RAMs, and a plurality of output RAMs,
the method comprising:
receiving a plurality of input activations for a first layer of a model; and
performing, at each time step of a plurality of time steps corresponding respectively to operations performed on columns within each tile column of a plurality of tile wide columns of the tile array, the operations comprising:
  distributing different feature values of a respective single input activation location along the tile column of a respective tile wide column,
  performing respective multiplications using a same respective weight for tiles in the respective tile column for the time step,
  computing a respective output result for each respective tile column for the time step including computing a sum of results of the multiplications for the tile column, and
  storing the respective output result for the tile column in a particular output RAM having a location within the same tile column and on a row from which the output result will be read by a subsequent layer of the model.

11. The method of claim 10, wherein multiplications along a tile column are multiplications of different features of a respective input activation.

12. The method of claim 10, wherein each wide column of the tile array comprises multiple tile columns of the tile array.

13. The method of claim 10, further comprising aligning input activations along an edge of each tile wide column of the plurality of tile wide columns of the tile array.

14. The method of claim 13, wherein aligning the input activations comprises aligning the input activations before performing any of the multiplications.

15. The method of claim 10, wherein the device is a machine-learning accelerator.

16. The method of claim 10, wherein computing the respective output result is performed by a vector accumulator that is configured to compute an accumulated sum from respective multiplication results along a single tile column.

17. The method of claim 10, wherein the device is configured to read each of the plurality of input activations only once.

18. The method of claim 17, further comprising using conveyor hardware to share each input activation with other tiles in a same row of a wide column.

19. One or more non-transitory computer storage media encoded with computer program instructions that when executed by a device comprising: (i) a tile array comprising a plurality of tiles, (ii) a plurality of input RAMs, and (iii) a plurality of output RAMs, causes the device to perform operations comprising:
receiving a plurality of input activations for a first layer of a model; and
performing, at each time step of a plurality of time steps corresponding respectively to operations performed on columns within each tile column of a plurality of tile wide columns of the tile array, the operations comprising:
  distributing feature values of a respective single input activation location along the tile column of a respective tile wide column,
  performing respective multiplications using a same respective weight for tiles in the respective tile column for the time step,
  computing a respective output result for each respective tile column for the time step including computing a sum of results of the multiplications for the tile column, and
  storing the respective output result for the tile column in a particular output RAM having a location within the same tile column and on a row from which the output result will be read by a subsequent layer of the model.

* * * * *